March 29, 1927.

T. SMITS 1,622,888

PACKING DEVICE FOR USE WITH PISTONS AND PISTON VALVES

Filed March 26. 1926

Inventor:
Theodorus Smits,
By Byrnes Townsend & Brickenstein,
Attorneys.

Patented Mar. 29, 1927.

1,622,888

UNITED STATES PATENT OFFICE.

THEODORUS SMITS, OF THE HAGUE, NETHERLANDS.

PACKING DEVICE FOR USE WITH PISTONS AND PISTON VALVES.

Application filed March 26, 1926, Serial No. 97,745, and in Netherlands March 30, 1925.

The invention relates to a piston or piston valve fitted with two discs movable relatively to each other and between which, one or more piston rings is or are arranged provided with one or more conical faces co-operating with one or more corresponding conical faces on a part of the piston body.

Constructions are already known in which the packing-rings split in the usual manner, are bevelled on one or two sides towards the middle that is to say, inwardly said rings being interposed between two faces provided on discs that are arranged at both sides of the ring and bearing against the bevelled faces of the packing-ring. This ring is forced outwards by bringing the faces between which the ring is arranged, closer to each other. The ring therefore may be interposed between the conical shaped face of a disc fixed to the piston rod and the conical face of a second disc, which can be adjusted longitudinally of the piston rod.

According to the invention to be now described the co-operating conical faces are such that the piston ring or rings is or are forced inwardly when the discs are adjusted towards each other. This construction has the advantage with regard to the known constructions, that the packing ring is adapted to engage by its own tension against the wall of the cylinder and that this tension may be varied by bringing the discs between which the ring is arranged closer to each other. Whilst with the known construction, the piston ring therefore is connected with the piston as a stiff member when the piston is mounted in the cylinder, the piston ring according to the invention retains the capacity of adjusting itself inwardly, which has proved to be of great importance in practice.

One embodiment of the invention is a construction according to which two packing-rings are arranged between the faces of discs which faces preferably are perpendicular to the axis of the piston or valve rod whilst a disc interposed between the discs and having a thickened edge or rim having conical faces, abuts against corresponding conical faces of both of the piston rings, the arrangement being such that on varying the distance between the discs the diameter of the piston rings is increased or decreased.

The invention will now be described with reference to the accompanying drawings in which.

Figure 1:
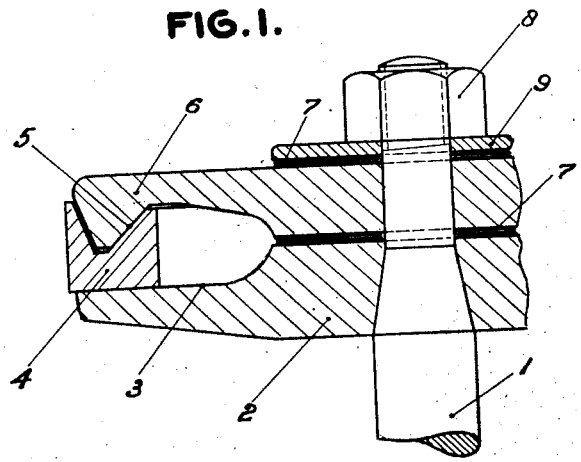
Figure 1 is a vertical section through a piston with one packing ring.

On the piston rod 1, a disc 2 is tightly fitted. This disc is provided with a face 3 perpendicular to the axis of the piston rod. Upon this face 2 the packing-ring 4 is arranged which is provided with an annular conical shaped groove. Against this conical face 5 bears the corresponding face of a disc 6 movable on the piston rod. Between the discs 2 and 6, spacing plates 7 are arranged, whilst on the upper face of the disc 6, similar spacing plates 7 may also be provided. Upon the upper spacing plates a washer is laid on which the nut 8 is clamped. By removing one or more plates 7 from between the discs and by refastening the nut 8, the discs 2 and 6 are moved towards each other so that the diameter of the packing-ring is decreased. The conical surfaces are so inclined with respect to the axis of the piston rod that the surfaces slide over each other to contract the ring as the discs are forced towards each other by the clamp nut 8. On the other hand, it is possible to increase the diameter of the packing-ring by allowing it to expand under its own tension by interposing more plates between the discs. The space between the washer 9 and the disc 6 may be regarded as a container for the plates.

Figure 2:
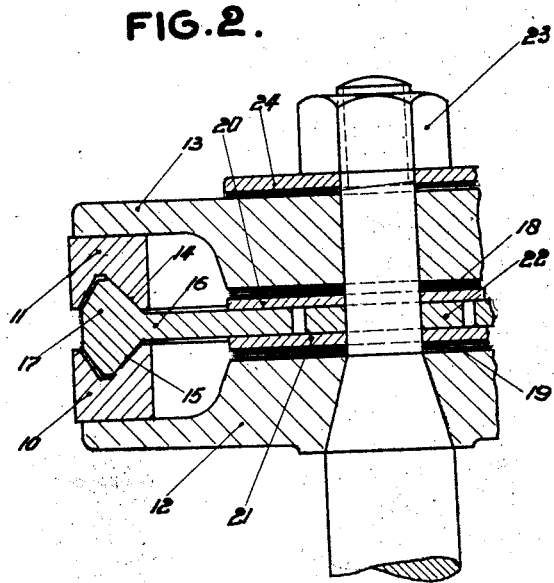
Figure 2 is a section through a piston with two such rings.

According to the construction shown in Figure 2, two piston-rings 10 and 11 are mounted between the discs 12 and 13, that is to say between faces that are perpendicular to the axis of the piston. These piston-rings are provided with annular grooves as before described. Against the inner conical faces 14 and 15 of these piston-rings bear corresponding faces of a disc 16 the outer circumference of which has a thickened edge or rim 17. The disc 16 may be directly clamped in between the discs 12 and 13 by the intermediary of spacing plates 18 and 19, but it is also possible to provide annular discs 20 and 21 between the disc 16 and the discs 12 and 13. A ring 22 may be mounted between the discs 12 and 13, which ring 22 is a little thicker than the disc 16. By screwing the nut 23 tightly on the piston rod, the disc 16 will not be clamped tight so that the piston rings together with the disc 16 may adjust themselves correctly within the cylinder. The piston rings, however, can only adjust themselves with regard to the disc 16 so that a correct engagement of the piston rings against the cylinder wall with the desired pressure may be obtained. Between the washer 24 and the upper disc 13 further spacing plates may be mounted.

What I claim is:

1. A piston or piston valve of the type including a rod, a pair of discs thereon adapted to be secured at different distances from each other, and a resilient split ring between said discs, characterized by the fact that said ring and one of said discs have cooperating conical surfaces arranged at such inclination to the axis of the rod that the movement of said discs towards each other contracts the ring.

2. A piston or piston valve comprising a rod, a pair of discs thereon, a resilient ring between said discs, said ring and one of said discs having cooperating conical surfaces for limiting the expansion of said ring and of such inclination that the movement of the discs towards each other contracts said ring, clamp means for forcing the discs towards each other, and means for limiting the approach of said discs towards each other to thereby determine the maximum expansion of said ring.

3. The invention as set forth in claim 2, wherein the conical surface on said ring comprises the inner wall of a groove having oppositely inclined peripheral walls, and said last named means comprises thin washers arranged between said discs.

4. A piston or piston valve as claimed in claim 1, characterized in that two piston rings (10 and 11) are interposed between the opposed faces of the discs (12 and 13) which faces are perpendicular to the axis of the piston or valve rod, whilst a disc (16) interposed between the discs (12 and 13) and having a thickened edge or rim (17) with conical faces (14 and 15), abuts against corresponding conical faces of both piston rings, the arrangement being such that on varying the distance between the discs (12 and 13) the diameter of the piston rings is increased or decreased.

In testimony whereof, I affix my signature.

THEODORUS SMITS.